United States Patent [19]

Warzawski et al.

[11] Patent Number: 4,640,876

[45] Date of Patent: Feb. 3, 1987

[54] FUEL CELL STRUCTURES

[75] Inventors: Bernard Warzawski, Paris; Pierre Fauvel, Limours, both of France

[73] Assignee: Occidental Chemical Corp., Niagra Falls, N.Y.

[21] Appl. No.: 756,128

[22] Filed: Jul. 8, 1985

[30] Foreign Application Priority Data

Jul. 27, 1984 [FR] France ................................ 84 12013

[51] Int. Cl.$^4$ ............................................. H01M 8/02
[52] U.S. Cl. ........................................ 429/37; 429/38; 429/39
[58] Field of Search ....................... 429/35, 36, 37, 38, 429/39, 185; 204/279

[56] References Cited

U.S. PATENT DOCUMENTS

| | | | |
|---|---|---|---|
| 3,278,336 | 10/1966 | Uline et al. | 429/35 |
| 3,320,092 | 5/1967 | Uline | 429/35 |
| 4,274,939 | 6/1981 | Bjareklint | 429/39 |
| 4,342,460 | 8/1982 | Eng | 204/279 |

Primary Examiner—Donald L. Walton
Attorney, Agent, or Firm—Sughrue, Mion, Zinn, Macpeak & Seas

[57] ABSTRACT

A single fuel cell (20) is built up from a plurality of plane members (21, 32, 42, 24). A plurality of such cells are stacked together to constitute a fuel cell structure. Each fuel cell in the structure requires access to three independent fluid circuits: an electrolyte circuit including an inlet orifice (88A, 98A) and an outlet orifice (88B, 98B); a gas fuel circuit including inlet and outlet orifices (108); and an oxidant circuit which may be constituted by inlets and outlets in communication with ambient air. In the final structure, these circuits must be effectively sealed from one another and from the surroundings (except for the special case of ambient air oxidant). This invention improves such sealing by preventing unwanted seepage between adjacent ones of the plane members (21, 32, 42, 24) due to defects in planeness and parallelism of the individual plane members. This is done by surrounding an area to be sealed off from another area by at least one rib which stands proud of the surface of the associated plane member and which is associated with at least one groove. When the stack is assembled the ribs are ideally deformed and received in the associated grooves, but in the vicinity of non-ideal portions of the plane members the ribs serve to block gaps through which the fluids would otherwise pass.

10 Claims, 20 Drawing Figures

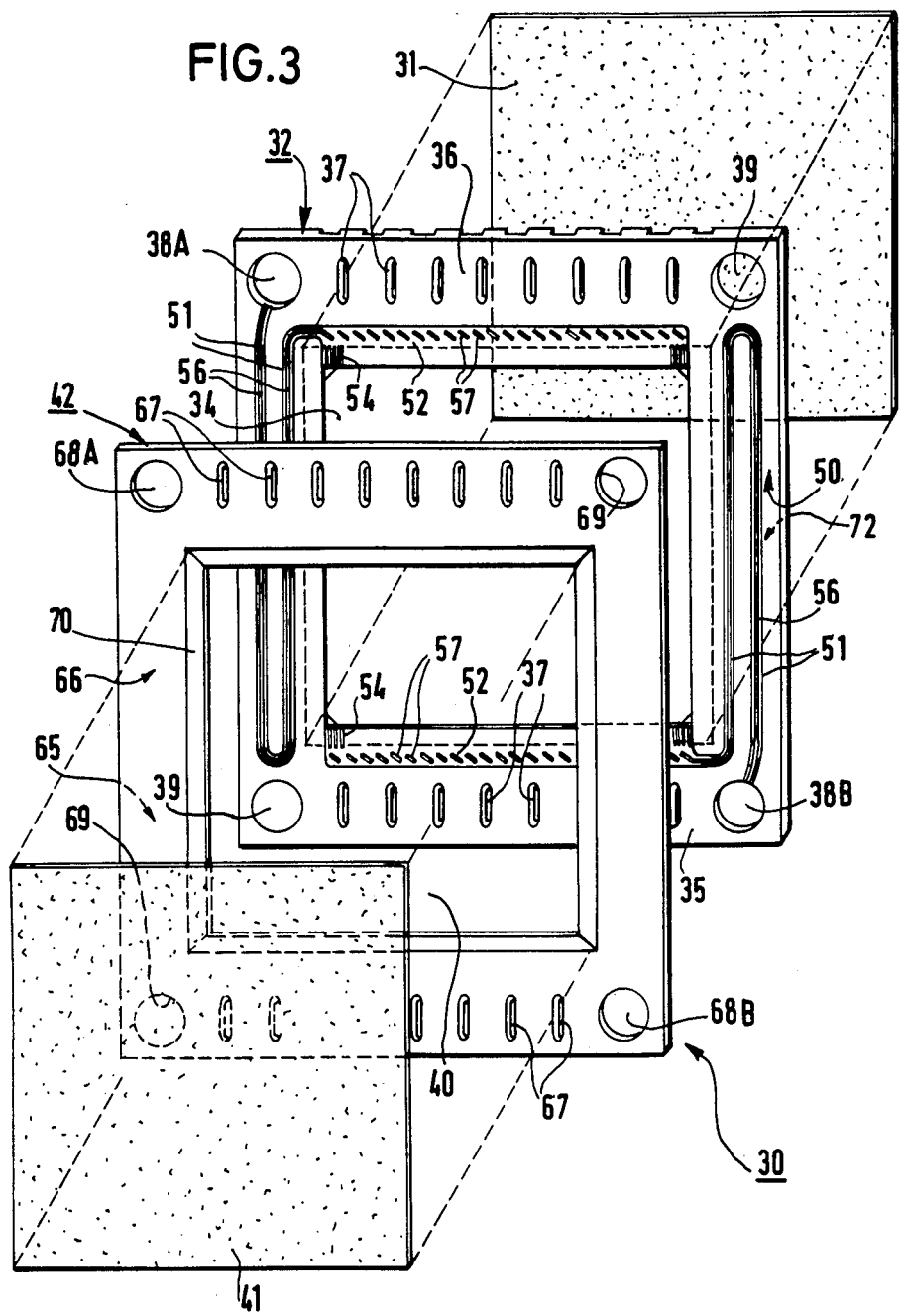

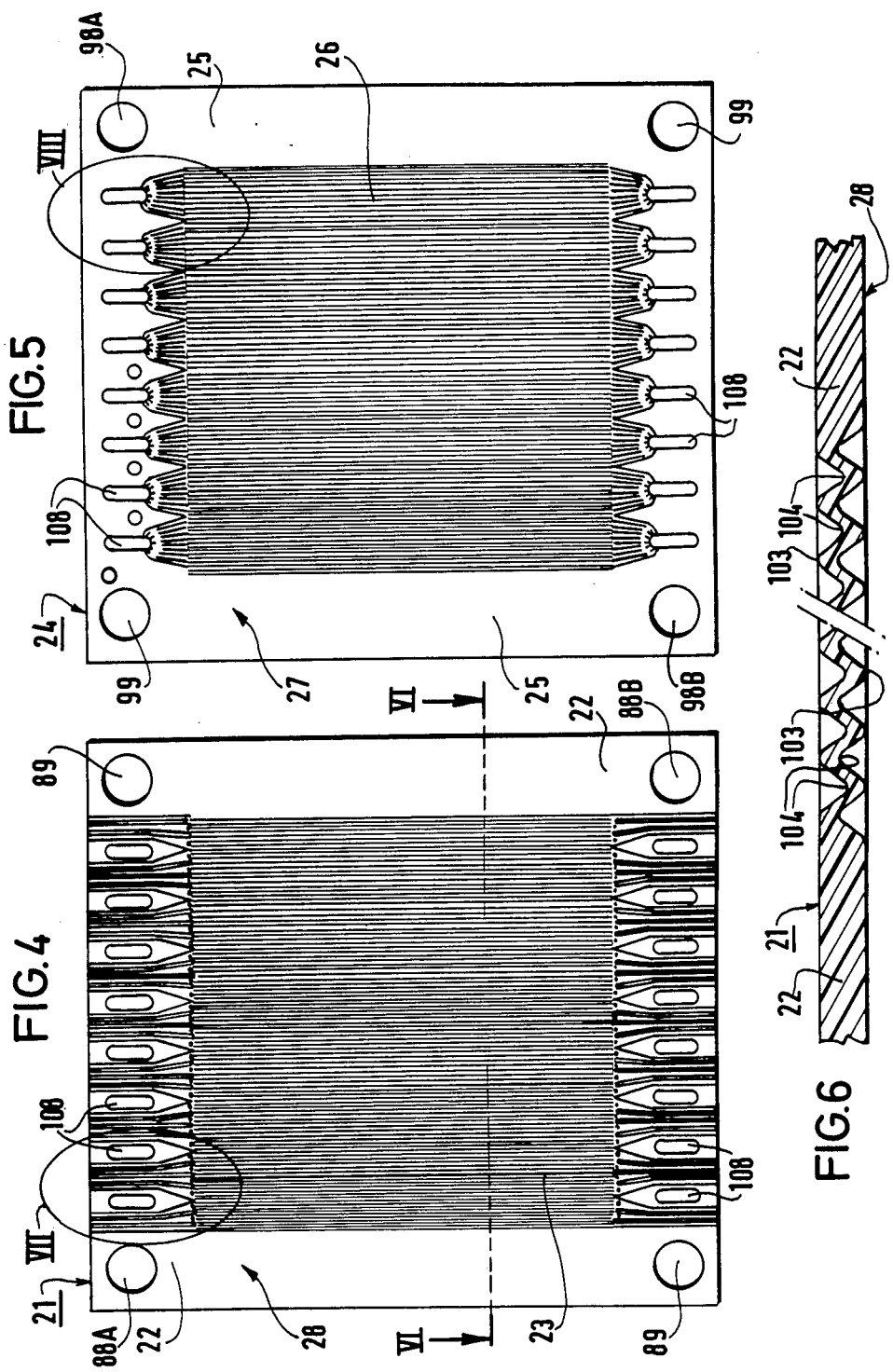

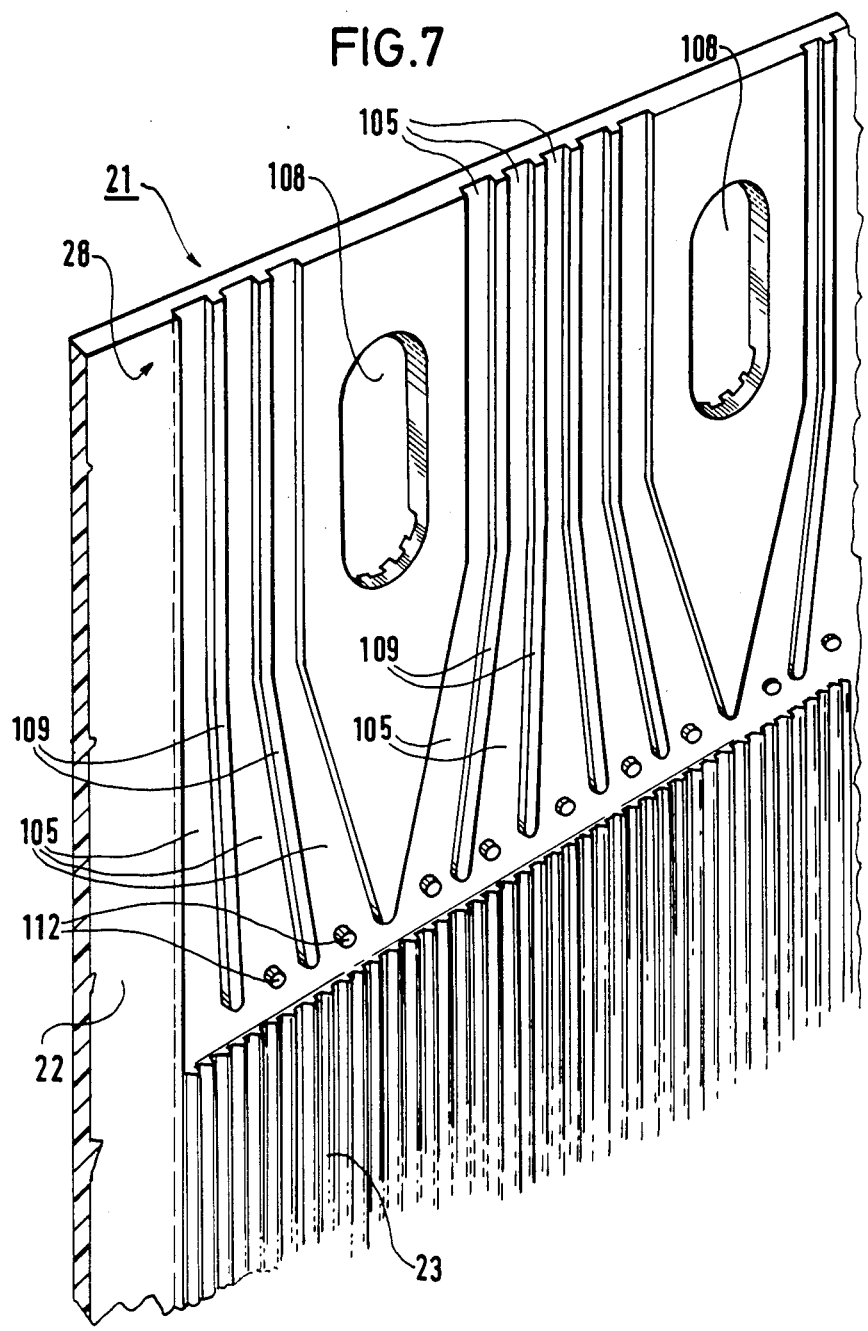

FUEL CELL STRUCTURES

FIELD OF THE INVENTION

The present invention relates to improvements in fuel cell structures. It relates in particular to a fuel cell structure which is essentially constituted by a plurality of identical juxtaposed cells, disposed in electrical contact with one another.

Overall, such a cell structure includes three distribution circuits which are common to all of the cells:

an electrolyte distribution circuit for distributing electrolyte from an external source and including, in particular, a common inlet channel and a common outlet channel;

a fuel distribution circuit for distributing fuel from an external source and including, in particular, at least one fuel inlet channel and at least one outlet channel for removing unburnt fuel and inert gases from the cell structure; and an oxidant distribution circuit including, in particular, a plurality of oxidant inlet and outlet orifices situated in the bottom and top faces of the cell structure.

In addition, each cell comprises, in outline:

first and second porous electrodes which are preferably plane in shape with parallel faces, one being a cathode and the other an anode, and each including a specific catalyst;

an electrolyte filling the gap situated between the said electrodes; and first and second impermeable bipolar current collectors comprising respective first and second frames of plastic material having at least one central conductive zone having channels on each of its faces, the first collector coming into electrical contact via the high points of its cathode face with the external surface of the said cathode, and via its anode face with the external surface of the anode of an adjacent cell, and the second collector coming into electrical contact via the high points of its anode face with the external surface of the said anode, and via its cathode face with the cathode of the other adjacent cell; the oxidizing gas from the said common oxidant distribution circuit flowing between the said cathode and the cathode face of the first collector and being supplied to the said cathode, and the fuel gas from the said common fuel distribution circuit flowing between the said anode and the anode face of the second collector and being supplied to the said anode; the first and second frames being provided with orifices to allow the electrolyte and the fuel to flow through the cell structure, the said orifices contributing by their juxtaposition to defining the said common inlet and outlet channels. Means are provided on the anode face of the second collector to enable the fuel from the inlet channels to be conveyed over the surface of the anode and away from said surface to the outlet channels; said means including grooves constituting a plurality of microchannels, which grooves are disposed in the top and portions of the said second frame.

Further, the first electrode is applied against a third frame made of plastic material and having a central orifice in the form of a quadrilateral, the top and bottom portions of the third frame including orifices for conveying fuel and electrolyte through the cell structure, said orifices corresponding to the orifices provided in the frames of the collectors, and likewise contributing to the formation of the said inlet and outlet channels for the fuel and the electrolyte; means being provided on one face of the third frame to enable electrolyte to be conveyed from the inlet channel, to an electrolyte compartment situated between the two electrodes, and from the said compartment to an outlet channel; the said means including grooves that open out into set back portions that constitute electrolyte distributing and collecting manifolds disposed on the top and bottom portions of the third frame along two opposite sides of the central orifice and in communication with the electrolyte chamber by means of a plurality of parallel microchannels delimited by ribs.

The second electrode is applied against one of the faces of a fourth frame facing the said current collector; the fourth frame is made of an insulating plastic material, is of identical contour to the third frame against which the first electrode is applied, and has fuel and electrolyte conveying orifices corresponding to those provided in the said third frame. The fourth frame is applied by a plane face against the face of the said third frame having the grooves and the electrolyte distributing and collecting manifolds.

When a repetitive stack is made using a predetermined elementary sequence of frames as defined above having a series of superposed orifices, a cell structure is obtained having a plurality of cells connected electrically in series together with a common channel for conveying electrolyte into each of the electrolyte compartments, a common channel for removing the electrolyte, a plurality of common channels for supplying all the anodes with fuel, and a plurality of common channels for evacuating gases.

The oxidant flows through the stacked cell structure by passing directly through the cathode compartments in a vertical direction via orifices and distribution means provided at the bottom and top edges of the corresponding frames.

All the frames are made of plastic material having a thickness in the range 0.2 mm to 5 mm, and they are advantageously molded.

BACKGROUND OF THE INVENTION

Once the assembly has been fixed together, eg. by gluing, by welding or by compression, it is essential for the three distribution networks (for fuel, for oxidant, and for electrolyte) to be sealed against any leakage between each other and also with the exterior (except in the case of air being used as oxidant, in which case the oxidant distribution network (only) may communicate freely with the exterior).

Unfortunately, the juxtaposed faces of the frames may depart sufficiently from being perfectly plane and parallel to cause sealing problems.

Preferred embodiments of the present invention overcome this problem and provide the desired degree of sealing for the various fluid distribution networks.

SUMMARY OF THE INVENTION

The present invention provides a fuel cell of the above-described structure and including the improvement wherein at least the fuel and electrolyte distribution networks are surrounded, at least on one face of one of the frames constituting a cell, by at least one rib of material which is deformable under stress, said rib standing proud from said face, and wherein the distance the said rib projects from said face is sufficient to compensate defects of planeness and of parallelism for the totality of the frames in sequence defining the said cell, with at least one adjacent groove being provided parallel to the said rib to receive excess material from the rib when the cell structure components are fixed together.

Advantageously two parallel ribs associated with three grooves are provided around each of the said networks.

Each rib and associated groove(s) are advantageously located on the same face of the frame concerned, but they may be located facing faces of two adjacent frames.

For the electrolyte distribution network: the network is constituted firstly by an inlet channel and an outlet channel formed by co-operation between corresponding orifices provided in the juxtaposed frames, and secondly by inlet and outlet grooves between electrolyte distribution and collection manifolds and corresponding electrolyte compartments situated between the said third and fourth frames. The said rib is then advantageously situated between the said third and fourth frames and surrounds the electrolyte inlet orifice, the inlet grooves, the electrolyte compartment, the outlet grooves and the electrolyte outlet orifice. The rib is preferably on the face of the third frame which also has the electrolyte compartment defining grooves thereon, but alternatively, the said rib could be situated on the face of the fourth frame facing the third frame, and/or on any other face.

If such a rib on a single face provides insufficient sealing, ribs may be provided on several faces, in which case it is possible to include ribs that surround only a portion of the electrolyte distribution circuit. Thus, it is possible to provide additional ribs around the electrolyte inlet and outlet orifices on at least one of the faces of the said first and/or second and/or fourth frames, and/or on the other face of the said third frame.

The gas fuel distribution network is constituted firstly by a fuel inlet channel and outlet channel formed by juxtaposing corresponding orifices in the frames, secondly by a gas compartment situated between the second collector and the second electrode of each cell, and finally by a plurality of grooves connecting each orifice to the gas compartment. A rib running all the way around the gas compartment is advantageously to be found on the face of the fourth frame facing the said second collector. Further, at least one frame is provided on at least one face of the frames around each fuel flow channel.

In one embodiment, this rib is to be found on at least one of the faces of the first frame and/or the third frame and/or the fourth frame.

If a single rib on one face provides insufficient sealing, ribs may be provided on several faces. In which case, an additional rib may surround a portion only of the fuel distribution circuit, eg. it may surround a single fuel flow orifice.

Naturally, if a plurality of ribs are superposed to seal a given network, the sum of the heights of the ribs at each point measured in a direction parallel to the stacking direction should be equal to the height of a single rib capable of compensating the statistical average of all the defects in planeness and parallelism of the three superposed frames of a cell.

The frame material may be selected from insulating synthetic materials such as polypropylene, polyethylene, polyvinyl chloride (PVC), acrylonitrile butadiene styrene (ABS), polysulfone, or polystyrene, and the said rib should integrally molded with the frames and should be made of the same material.

In another embodiment, the ribs are added to the frames and they are made from material selected from natural and synthetic rubbers.

BRIEF DESCRIPTION OF THE DRAWINGS

An embodiment of the invention is described by way of example with reference to the accompanying drawings, in which:

FIG. 3 is a diagrammatic exploded perspective view of the electrolyte compartment of the FIG. 2 cell;

FIG. 4 is an elevation view of one face of a bipolar current collector from the FIG. 2 cell;

FIG. 5 is an elevation view of the anode face of a bipolar current collector from the FIG. 2 cell;

FIG. 6 is a diagrammatic section on a larger scale on a line VI—VI in FIG. 4;

FIG. 7 is a perspective view on a larger scale of a portion or detail VII of FIG. 4;

MORE DETAILED DESCRIPTION

Figure 1:
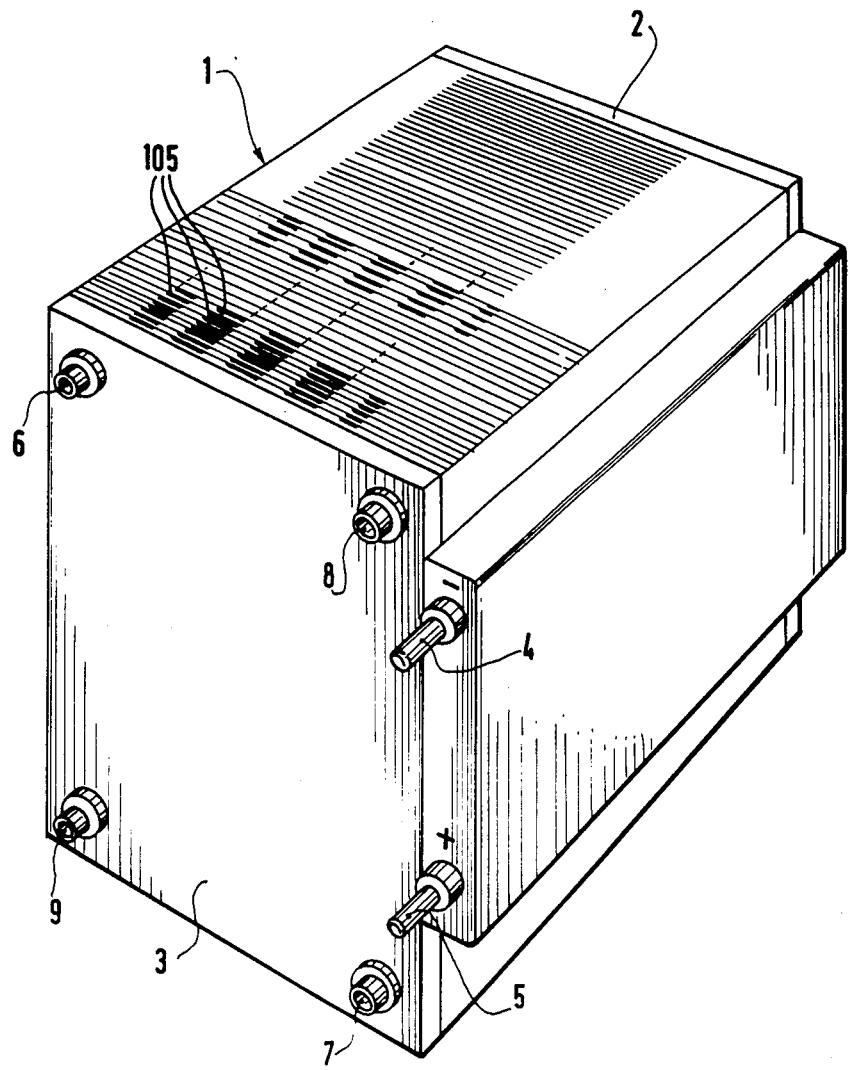
FIG. 1 is a diagrammatic perspective view of a fuel cell structure in accordance with the invention.

FIG. 1 shows a cell structure 1 comprising a stack of cells in accordance with the invention. The cell structure is provided with end plates 2 and 3 and with terminal posts 4 and 5 connected to respective end current collectors of the stack.

Orifices 6 and 7 are respectively an electrolyte inlet orifice and an electrolyte outlet orifice. Orifices 8 and 9 are respectively a gas fuel (hydrogen in this case) inlet orifice and outlet orifice.

The oxidant (air) enters the cell structure via the top ends of passages 105 as shown in the figure. The passages 105 have bottom end orifices which are similarly disposed on the bottom of the cell structure.

Figure 2:
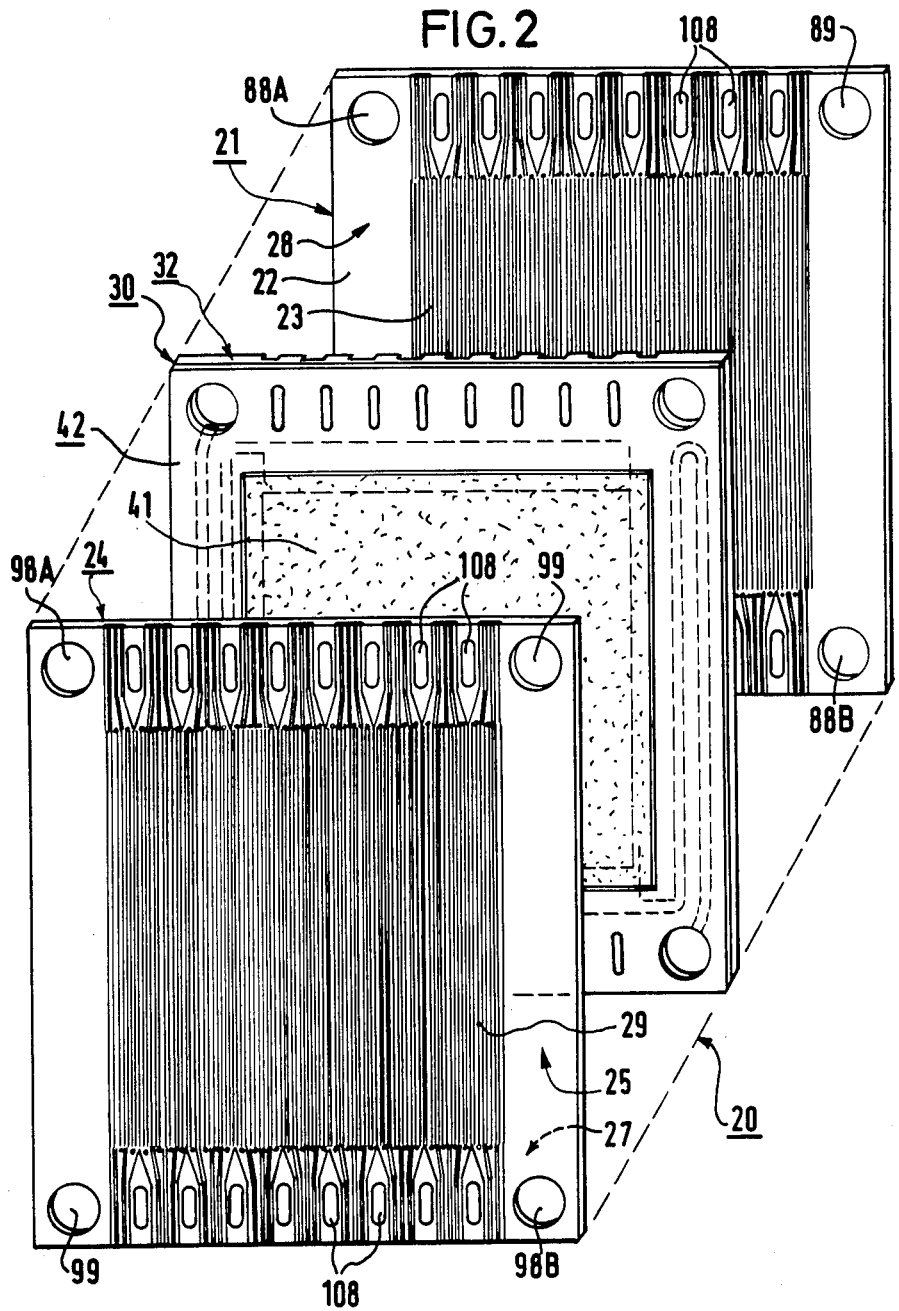
FIG. 2 is a diagrammatic exploded perspective view of a cell of the FIG. 1 fuel cell structure.

The cell structure 1 is constituted by juxtaposing cells 20 such as the cell shown diagrammatically in FIG. 2. The middle component 30 of the cell shown in FIG. 2 is shown in greater detail in FIG. 3. For reasons of clarity, the sealing ribs of the present invention have been omitted from FIGS. 2 and 3 which are intended to show the relative dispositions of the various components of a cell; subsequent figures show each of the components in greater detail.

The cell shown in FIGS. 2 and 3 includes a cathode 31 or first electrode associated with the cathode face 28 of a first bipolar current collector 21. The collector (see FIG. 4) comprises a frame 22 referred to as the "first" frame made of plastic material and a central conductive zone 23 having channels and in electrical contact against the outside face of the cathode 31. The bipolar collector 21 has a central anode conductive zone on its face which is not visible in FIG. 2 but which is identical to the face shown in FIG. 5, this anode zone is in electrical contact which the external anode face of an adjacent cell. The face of the cathode 31 facing the collector 21 is in contact with the gaseous oxidant, and the opposite face of the cathode 31 is in contact with the electrolyte.

Likewise, an anode 41 or second electrode is associated with the anode face 27 of a second bipolar current collector 24. Like the current collector 21, it comprises a "second" frame 25 made of plastic material and a central conductive anode zone 26 which is not visible in FIG. 2 but which is shown in FIG. 5, and which is in electrical contact with the anode 41. The central zone 29 of the collector 24 visible in FIG. 2 is intended to come into electrical contact with the cathode of an adjacent cell. One face of the anode 41 is in contact with the electrolyte while its other face facing the collector 24 is in contact with the fuel gas.

These anode 41 and the cathode 31 may be made of carbon or graphite together with a plastic material such as polytetrafluoroethylene for example, and each electrode includes a specific catalyst.

By way of example only, the electrodes may be of flexible structure as described in French Pat. No. 79 25 879 of Oct. 18, 1979 (equivalent to U.S. Pat. No. 4 317 867). They may be made, in particular, by the methods described in French Pat. Nos. 79 25 877 and 79 25 878 likewise filed Oct. 18, 1979 (equivalent to U.S. Pat. No. 4 317 789 and to Canadian Pat. No. 1 139 833 respectively).

FIGS. 4 to 8 show additional details of the current collectors. FIG. 4 shows the cathode face 28 of the bipolar collector 21 while FIG. 5 shows the anode face 27 of the collector 24. (Since the collectors 21 and 24 are identical, it could also be said that FIGS. 4 and 5 show the cathode face and the anode face respectively of the same collector).

In FIGS. 2 and 4 which show the cathode collector 21, the electrolyte inlet orifice is referenced 88A, the electrolyte outlet orifice is referenced 88B and the orifices for facilitating component assembly are referenced 89. Likewise, in FIGS. 2 and 5, the corresponding orifices in the anode collector 24 are referenced 98A, 98B and 99. Orifices for conveying fuel are referenced 108.

The frames 22 and 25 of the collectors 21 and 24 are advantageously made from the same synthetic insulating material: eg. polypropylene; polyethylene; polyvinyl chloride (PVC); acrylonitrile butadiene styrene (ABS); polysulfones; polystyrene. These plastics may be impregnated with various suitable materials for modifying their mechanical and thermal characteristics, eg. an inert material such as talc. Thus, by way of example, in order to obtain a coefficient of thermal expansion which is close to the coefficient of the central conductive zones of the collectors, the frames may be made from talc-impregnated polypropylene with eg. 5% to 90% talc, and preferably with 35% to 45% talc.

The central conductive zones of a collector is shown in section and on an enlarged scale in FIG. 6. It includes corrugations 103 defining channels 104 which extend generally vertically for guiding gas flow. The pitch and the depth of the corrugations, and thus of the channels, may be 0.2 mm to 5 mm, and is preferably 0.5 mm to 1.5 mm.

The central conductive zones of the collectors is advantageously made from the same plastic material as the frames are made from, but impregnated with a different material, eg. powdered metal, graphite, carbon, oven black, or acetylene black, or fibers of carbon or graphite, or a mixture of such materials. By way of example, the central conductive zones may be made of carbon black impregnated polypropylene having 10% to 90% carbon black, and preferably 30% to 50%.

The frames of the collectors may be made by thermocompression or by injection molding. Injection molding is particularly advantageous for making current collectors since the materials that respectively constitute the insulating frame and the central conductive zone are injected simultaneously into the mold while they are both in a fluid state, thereby welding the two materials together and avoiding any discontinuity between the two zones. Injection molding is also cheap.

The means for supplying the fluids to the cathode and anode compartments are described below.

The face 28 of the collector 21 shown in FIG. 4 is intended to be supplied with oxidant, eg. oxygen, while the face 27 of the collector 24 shown in FIG. 5 is supplied with fuel, eg. hydrogen.

As can be seen in FIG. 7, the top portion of the face 28 of the frame 22 of the collector 21 is fitted with grooves or set back portions 105 which are in communication with the exterior and which enable the face 28 of the collector to be supplied with oxidant. Similar grooves are provided in the bottom portion of the frame 22 for oxidant evacuation. The oxidant thus follows a substantially rectilinear path and avoids head losses associated with changes in direction, which head losses could be particularly large when using an oxidant such as atmospheric air because of the very high flow rates that are required.

Figure 8:
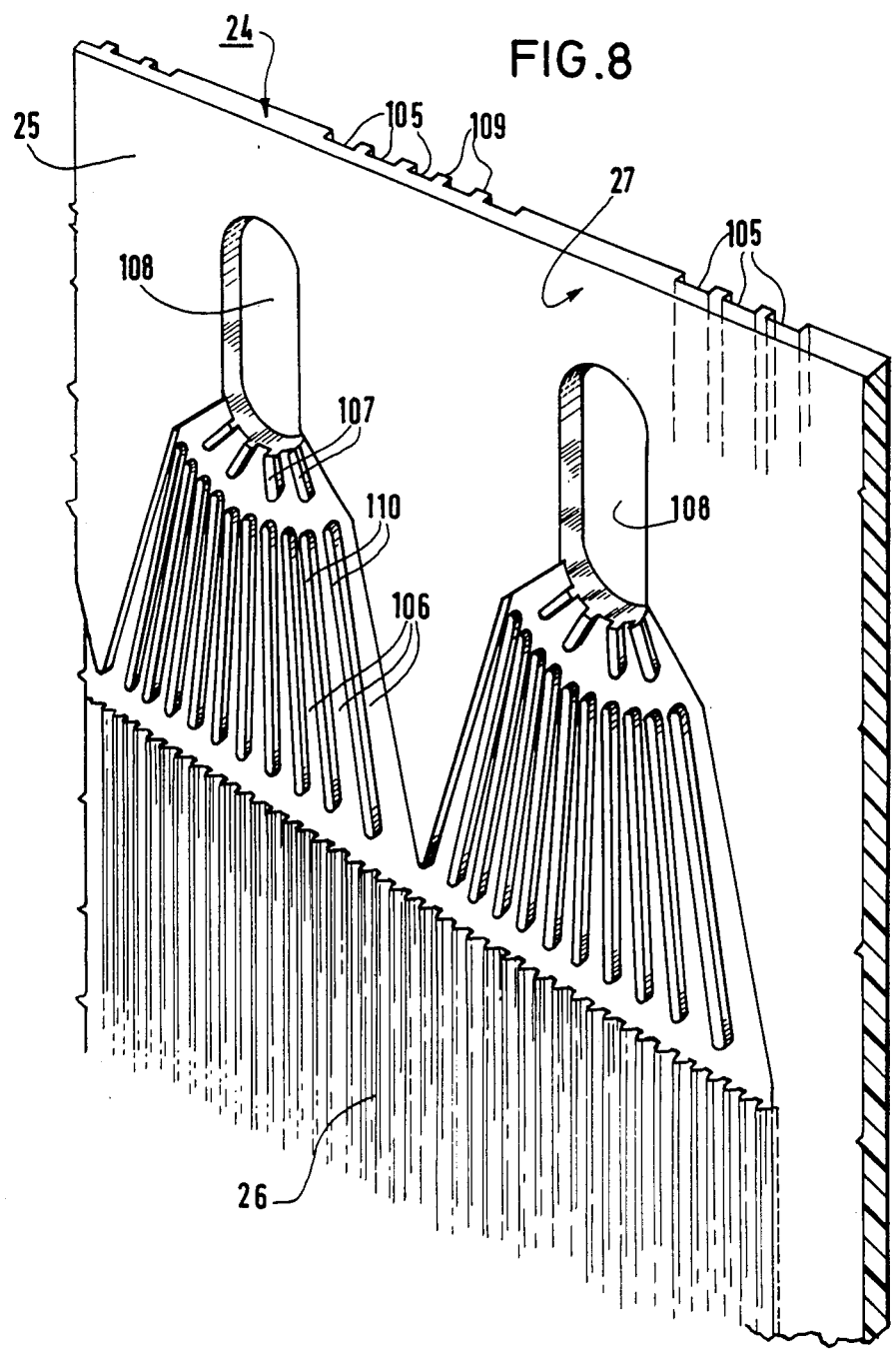
FIG. 8 is a perspective view on a larger scale of a portion or detail VIII of FIG. 4.

As can be seen in perspective in FIG. 8, the top portion of the anode face 27 of the frame 25 of the collector 24 is provided with grooves or set back portions 106 for supplying the anode face of the collector with fuel from the fuel-conveying orifices 108. Similar grooves are provided in the bottom portion of the frame 25 for evacuating the fuel.

Additional flow-distributing means are provided in the said grooves or set back portions 105 and 106. These means are constituted by elongate ribs which define distribution channels, with the top faces of the ribs being level with the face of the collector from which the grooves are set back, and thus serving to maintain a gap between the bottoms of the grooves and the adjacent component in the fuel cell assembly. The channels formed in this way are substantially vertical. It follows that since the channels delimited by the corrugations on the conductive zones of the collectors are also generally vertical as shown in the figures, the flows of fuel and of oxidant are both in substantially the same vertical direction along the faces of the collector.

As can be seen with reference to FIG. 7, the oxidant flow distributing ribs 109 are elongate and define distribution channels which are substantially vertical on the figure and which are flared towards the conductive zone 23 of the collector 21. The path followed by the oxidant over the cathode face of the collector 21 is quasi-rectilinear, and there is no significant obstacle or change of direction. In between the flared ends of the ribs 109 adjacent to the conductive zone 23 there are studs 112. Since the distribution channels open out over the entire horizontal edge of the conductive zone 23 of the collector, the oxidant is excellently distributed over the cathode face.

As can be seen with reference to FIG. 8, the fuel supply orifices 108 are oblong in shape, and the grooves or set back portions 106 for conveying the fuel are in communication with the ends of the oblong orifices that are closest to the central conductive zone 26 of the collector 24. The fuel distributing ribs define a delta network which flares away from the said orifices 108 towards the conductive zone 26 of the collector. Ribs 107 situated close to the orifices 108 define a small number of short channels which in turn lead to a larger number of longer intermediate channels defined by ribs 110 and leading to the vicinity of the channels in the conductive zone 26 of the collector. Each intermediate channel supplies fuel to at least one of the channels 104 in the conductive zone 26 of the collector 24. The use of elongate fuel distribution channels makes it possible to stack a large number of cells in a fuel cell structure while retaining low head loss in the fuel flow channels which are common to all of the cells.

FIGS. 9 to 15 show components of the assembly 30 shown in FIGS. 2 and 3.

Thus, the cathode 31 is applied against a third frame 32 having a central orifice 34 in the form of a quadrilateral and made of insulating plastic material. Likewise, the anode 41 is applied against a fourth frame 42 having a central orifice 40 in the form of a quadrilateral and made of insulating plastic material. When the third and fourth frames are fixed together, to the cathode and to the anode, they constitute an electrolyte compartment.

The frames 32 and 42 are advantageously made of the same material as the frames 22 and 25. The thickness of the frame 32 may be about 0.2 mm to 5 mm, and is preferably 0.5 mm to 1.5 mm. The thickness of the frame 42 may be about 0.1 mm to 5 mm, and is preferably 0.3 mm to 0.6 mm. In the example shown, the central orifices 34 and 40 are square.

Figure 9:
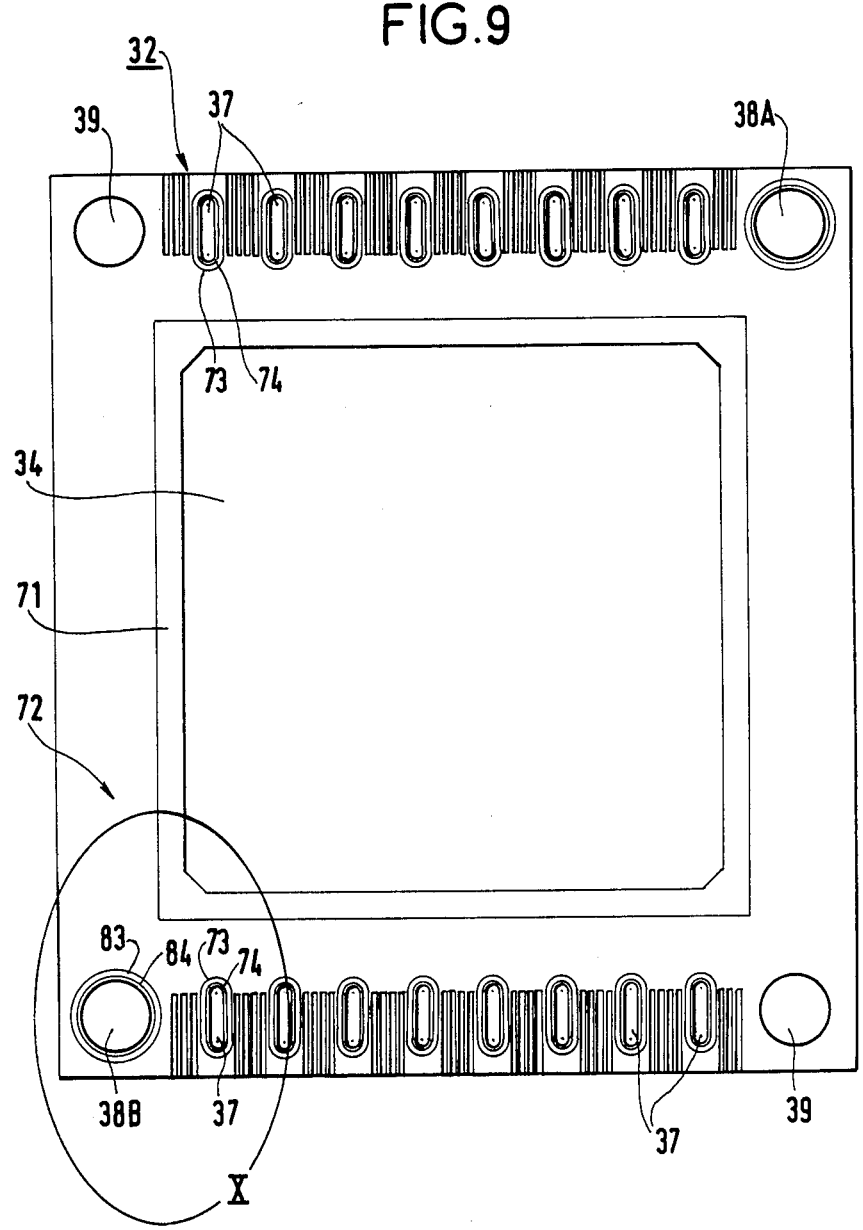
FIG. 9 is an elevation view of one face of the third frame supporting the cathode of the FIG. 2 cell.
Figure 12:
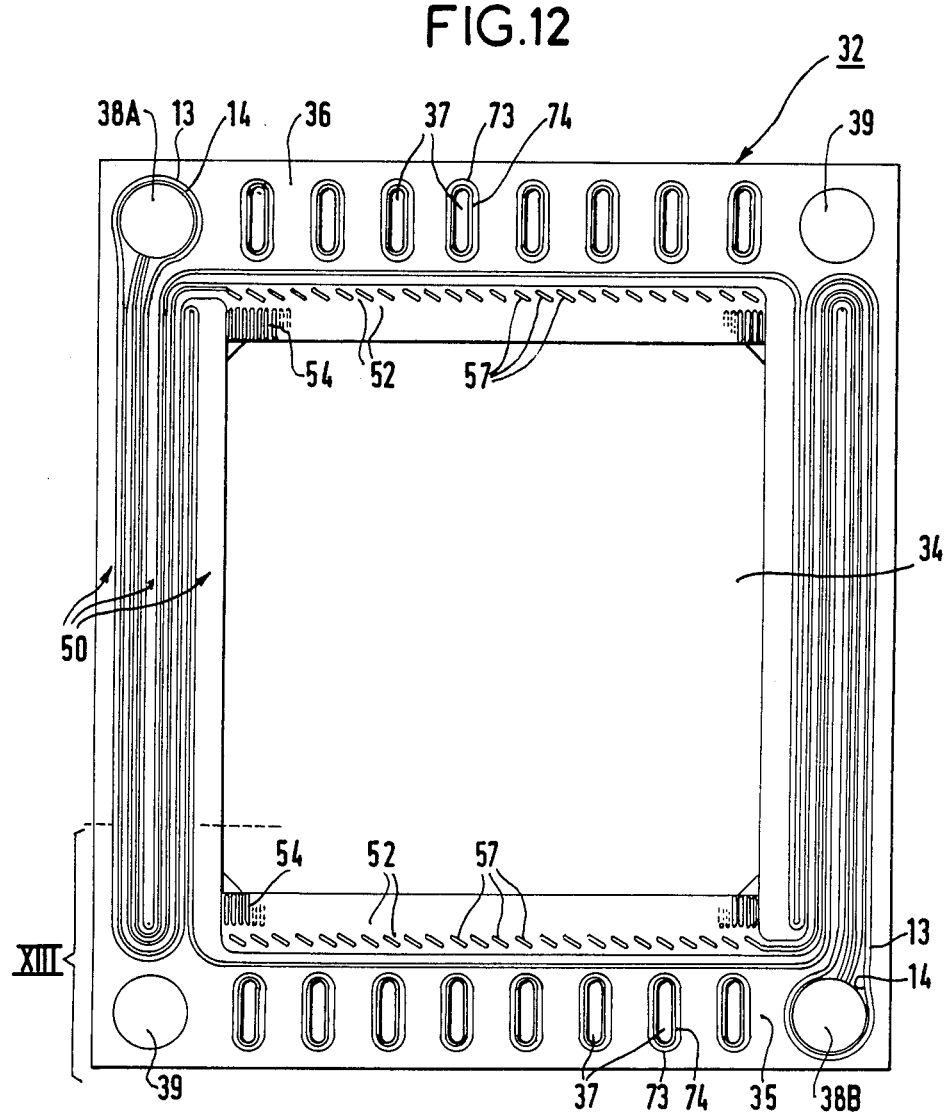
FIG. 12 is an elevation view of the opposite face of the third frame to that shown in FIG. 9.

Reference is made to FIGS. 9 and 12 which show the face 72 of the frame 32 that faces the cathode collector 21 and the face 50 of the same frame, but on the electrolyte compartment side thereof. The bottom and top portions 35 and 36 of the frame 32 are provided with orifices for conveying fuel and electrolyte through the fuel cell structure. Reference 37 designates fuel flow orifices which are oblong in the example shown and which are intended to coincide with the above-described orifices 108. An orifice 38A conveys electrolyte through the fuel cell structure and coincides with the above-described orifices 88A and 98A. An orifice 38B serves to evacuate electrolyte from the fuel cell structure and coincides with the above-described orifices 88B and 98B. Orifices 39 can be used for alignment of the components during assembly and/or for passing tie bars through a completed fuel cell assembly, and they coincide with the above-described orifices 89 and 99. FIG. 9 shows that the portion of the frame 32 which delimits the central orifice 34 and against which the cathode 31 is applied has a set back portion 71 for receiving the cathode so that it does not overlap the face 72 of the frame 32.

Figure 10:
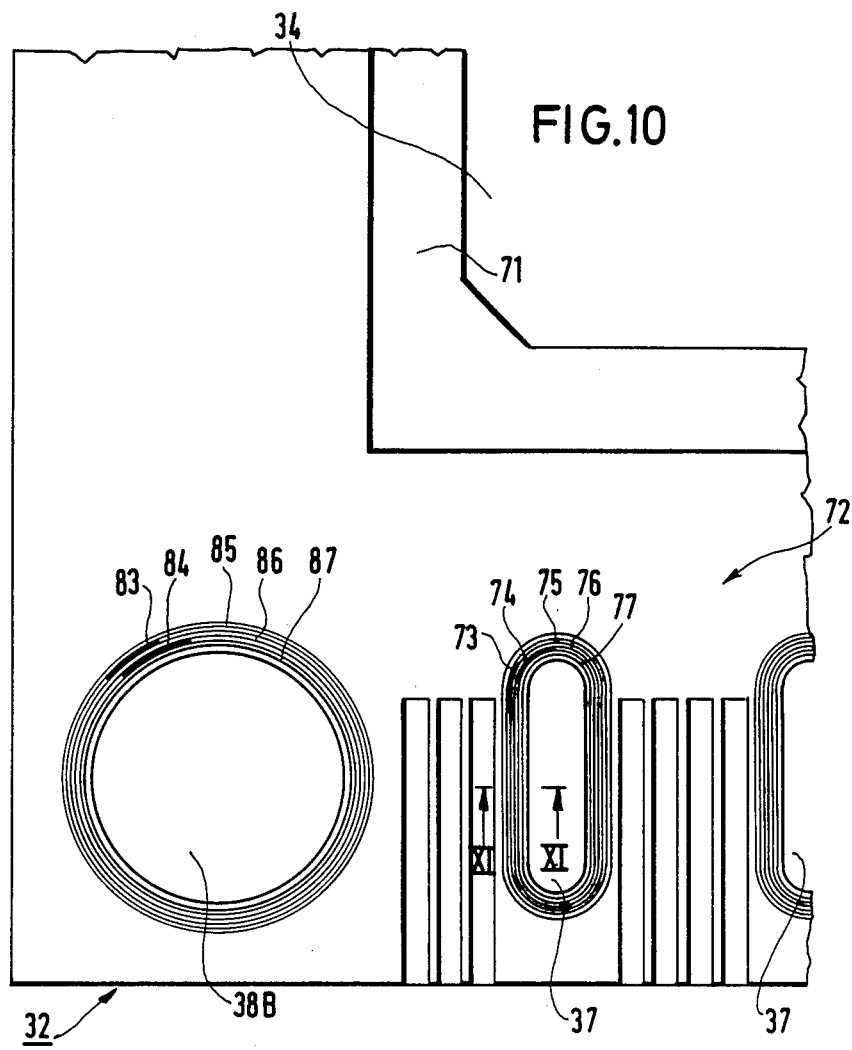
FIG. 10 is an elevation view on a larger scale of a portion or detail X of FIG. 9.
Figure 11:
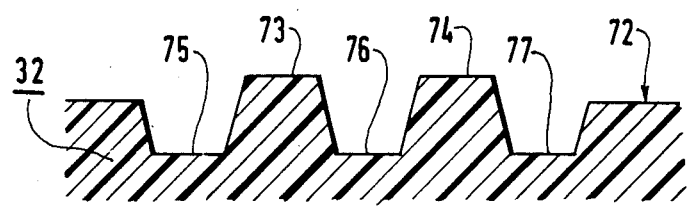
FIG. 11 is a diagrammatic section view on a larger scale on a line XI—XI of FIG. 10.

In accordance with the invention, and in order to contribute to sealing the fuel distribution network, each of the orifices 37 is surrounded on the face 72 of the frame 32 by two ribs 73 and 74 which are shown on an enlarged scale in elevation in FIG. 10 and in section in FIG. 11. The ribs 73 and 74 are parallel to each other and are integrally molded with the frame 32, and are consequently made of a material which is capable of deforming under compression. These ribs stand proud of the face 72 and are themselves surrounded by three parallel grooves 75, 76, and 77 into which excess material from the ribs may be thrust when the frame 32 is fixed to the frame 22. By way of example, the ribs may be about 50 microns thick. The profile shown in the section of FIG. 11 is given merely by way of example. In order to make FIG. 10 easier to read, the ribs are made to stand out by short lengths of heavy line.

Further, in order to contribute to sealing the electrolyte distribute network, the orifices 38A and 38B are likewise surrounded on the face 72 of the frame 32 by parallel ribs 83 and 84 and by parallel grooves 85, 86, and 87 of the same characteristics as the ribs and the grooves associated with the orifices 37 (see FIG. 10 which shows the orifice 38B on a larger scale).

Figure 13:
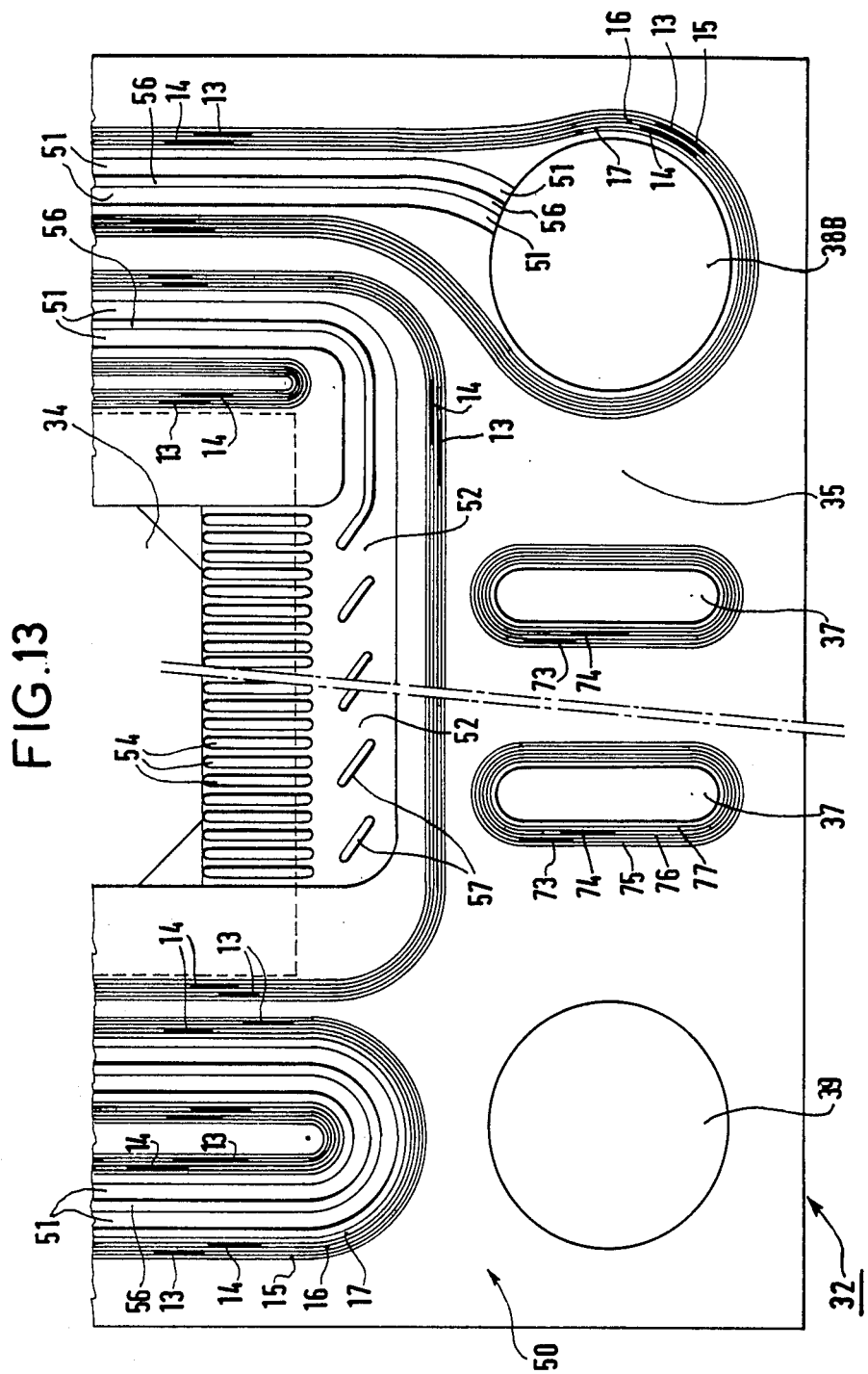
FIG. 13 is an elevation view on a larger scale of the bottom portion XIII of the face of the FIG. 12 face of the third frame.

Reference is now made to FIGS. 12 and 13 which show the face 50 of the frame 32 that comes into contact with the plane face 65 of the frame 42 and which defines, in association therewith an electrolyte compartment (see FIG. 3).

FIG. 12 shows that the fuel is distributed through orifice 37 which are surrounded on the face 50 by peripheral sealing ribs identical to those provided on the face 72 of the frame 32.

The electrolyte distribution network includes means for conveying electrolyte from the orifice 38A to the central orifice 34, and from the central orifice 34 to the orifice 38B. These means include grooves 51 (see FIG. 13) which lead to set back portions which constitute manifolds 52 for distributing and for collecting the electrolyte and located at the top 36 and at the bottom 35 of the frame 32 along facing opposite sides of the central orifice 34 and communicating with the electrolyte compartment via a plurality of parallel microchannels delimited by ribs 54. The tops of the ribs 54 are level with the face 50 of the frame 32.

The grooves 51 preferably follow an elongate path and are preferably of small cross section. This is because it is important to increase the series resistance of the electrolyte feeder system to each cell in a multiple cell structure since the electrolyte is physically supplied in parallel to all cells which are electrically connected in series. High resistance inlet and outlet feeder dpaths ensure relatively low shunt losses. Another advantage of feeding electrolyte via long and narrow feeder paths is that the head loss in the electrolyte feeder system is thus determined independently of the head loss in any particular compartment, and thus ensure that the electrolyte is evenly distributed to all the cells in a multi-cell structure regardless of such variations as may exist between the head losses across different cells.

In the example shown the grooves 51 are U-shaped with the bottoms of the Us being situated at the opposite sides of the central orifice 34 to the corresponding orifices 38A or 38B, thereby causing the electrolyte to flow substantially twice the length of a side of the central orifice 34 between the electrolyte compartment and each of the orifices 38A and 38B. By way of example, the grooves 51 may be 0.5 mm to 10 mm wide.

The bottoms of the grooves 51 and of the electrolyte distributing and collecting manifolds 52 have means such as studs or ribs which rise to the level of the face 50 of the frame 32 and which are intended to maintain a gap between the frame 42 and the said bottoms of the grooves and the manifolds. They also serve to regularize the flow of electrolyte. Thus, in the example shown, respective ribs 56 run along the length of each of the grooves 51. Further, the manifolds 52 include a plurality or ribs 57 disposed in parallel and serving to deflect electrolyte flow towards the electrolyte chamber. The tops of the ribs 56 and 57 are level with the face 50 of the frame 32.

In order to seal the electrolyte compartment in accordance with the invention, the entire electrolyte flow network as defined on the face 50 is surrounded by ribs and grooves similar to those which surround the orifices 37 (same thickness, same spacing).

Thus, parallel ribs 13 and 14 and parallel grooves 15, 16 and 17 associated therewith surround the electrolyte inlet orifice 38A, run around the outer edges of both sides of the inlet U-shaped groove and run around the sides of the central orifice 34, to continue uninterrupted in a symmetrical arrangement around the outlet U and the outlet orifice 38B. The entire electrolyte distribution network on the face 50 is thus isolated from the other fluids that flow through the same frame. In addition, the risk of electrolyte leaking across from one arm of a U to another and thus setting up a short circuit is greatly reduced, as is the possibility of a direct electrolyte leak between a branch of a U and the central compartment.

Figure 14:
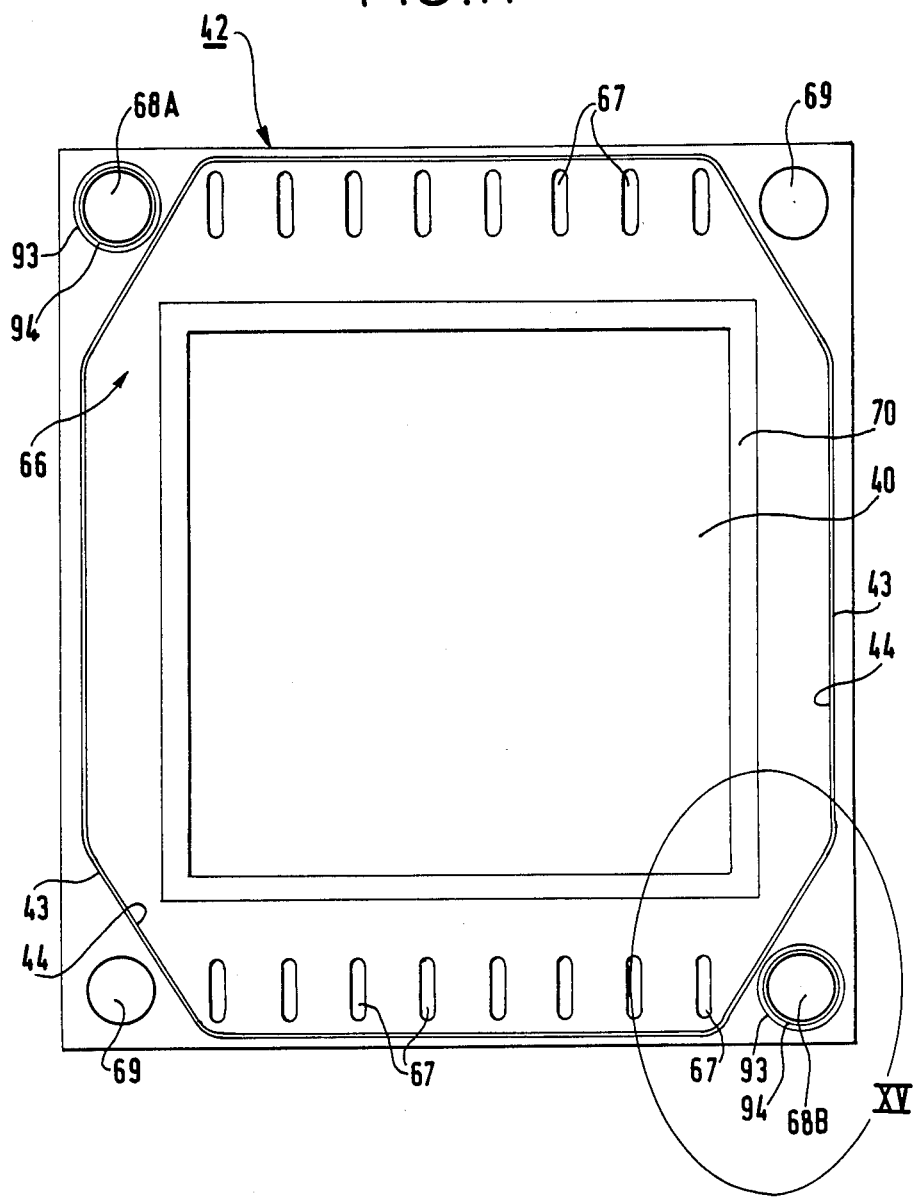
FIG. 14 is an elevation view of the face of a fourth frame supporting the anode of the FIG. 2 cell.
Figure 15:
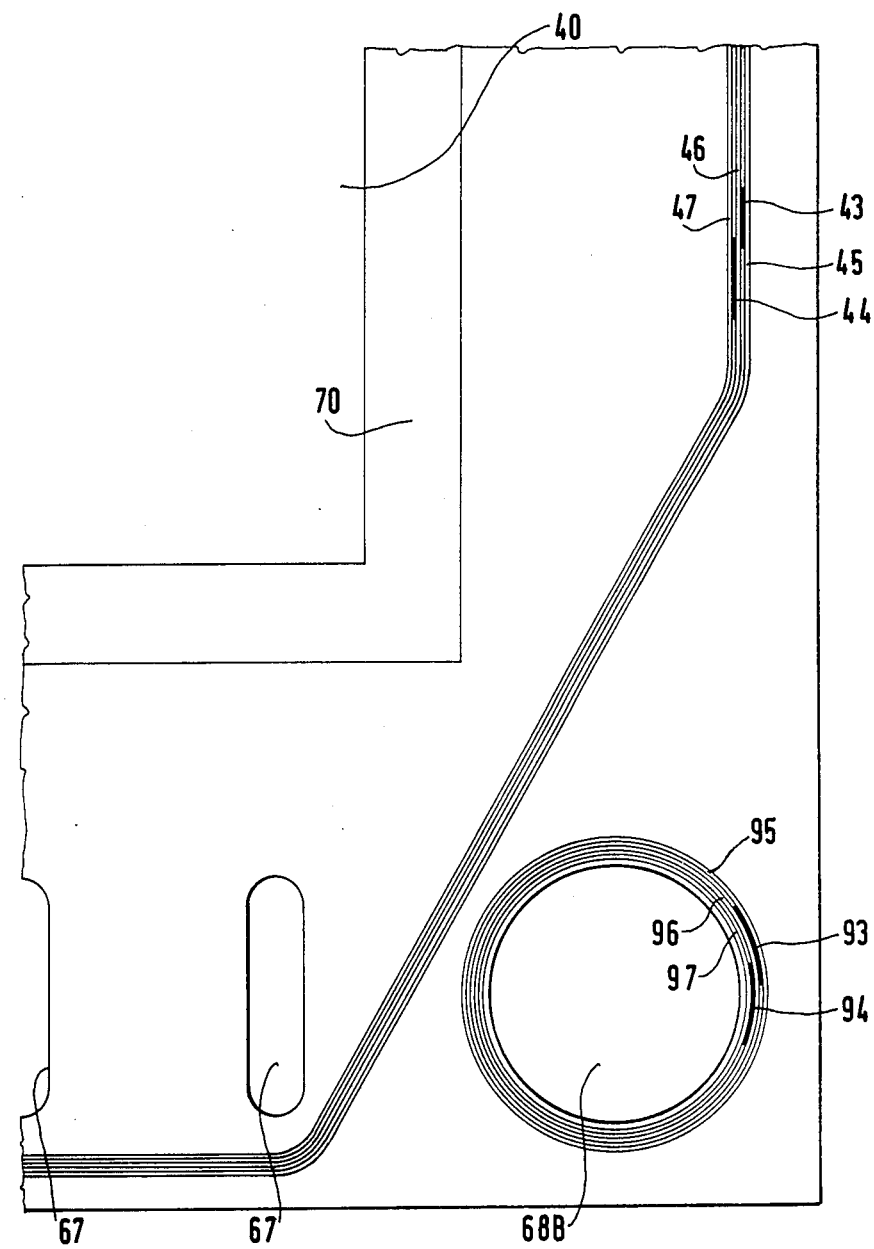
FIG. 15 is an elevation view on a larger scale of a portion or detail XV of FIG. 14.
Figure 16:
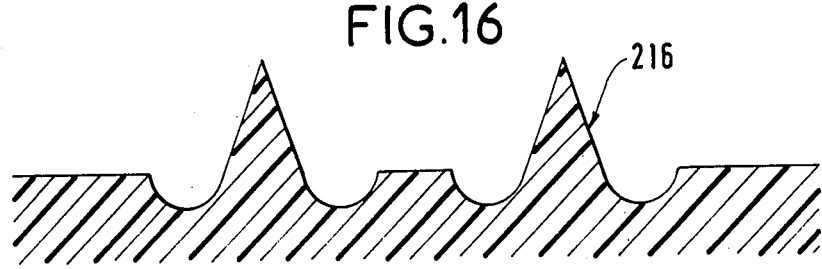
FIGS. 16 to 20 are sections through variants of the ribs shown in FIG. 11.
Figure 17:
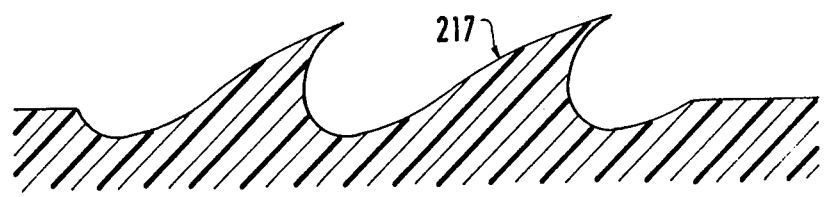
Figure 18:
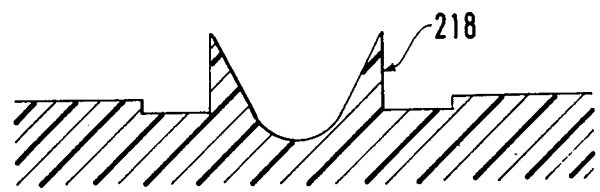
Figure 19:
Figure 20:
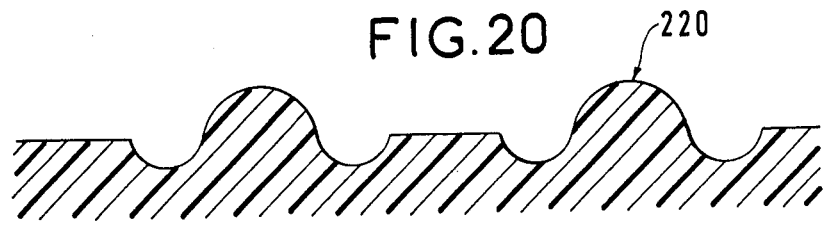

The face 65 of the frame 42 which closes the electrolyte compartment is plane in the present example and thus free from surface ribs. The face 65 is thus not illustrated. In contrast the opposite face 66 of the frame 42 is shown in FIGS. 14 and 15. It is intended to come into contact with the face 27 of the collector as can be seen in FIG. 5, in order to define the anode compartment.

References 67 designate orifices for fuel flow, references 68A and 68B designate electrolyte inlet and outlet orifices, and referenced 69 designate orifices corresponding to the orifices 39, 89 and 99. The portion of the frame 42 delimiting the central orifice 40 and against which the anode 41 is applied has a set back portion 70 for receiving the anode so that it does not overlap the face 66 of the frame 42.

The electrolyte distribution network is sealed in accordance with the invention around the orifices 68A and 68B by ribs 93 and 94 identical to the ribs which surround the orifices 38A and 38B (see FIG. 15). Grooves 95, 96 and 97 are associated therewith.

The fuel compartment is sealed by two parallel octagonal ribs 43 and 44 together with their associated grooves 45, 46 and 47, said ribs and grooves surrounding the central compartment 40 together with all the orifices 67.

To recapitulate, the various sealing ribs described above are listed below:

Electrolyte Distribution Network

Ribs are provided around the electrolyte inlet channel through the fuel cell structure on the faces 72 and 50 of the third frame 32 and around the orifice 68A on the face 66 of the forth frame 42. The same applies to the electrolyte outlet channel and the orifices 38B and 68B. Finally, ribs are provided on the face 50 of the third frame 32 that completely surround the network for feeding electrolyte from the inlet orifice to the central electrolyte compartment and from the central compartment to the outlet orifice.

Fuel Distribution Network

Ribs are provided on the faces 72 and 50 of the third frame 32 around the fuel flow orifices 37, and polygonal ribs are provided around the anode compartment on the face 66 of the fourth frame 42.

When the frames are fixed together, three sets of two ribs each are superposed around the electrolyte flow orifices and two sets of two ribs each plus one all-embracing set of polygonal ribs are superposed around the fuel flow orifices.

In the example described, sealing is provided by superposing the said three sets of ribs for which the total height is greater than the expected defects in parallelism of the four superposed frames, and can therefore be relied on to compensate for such defects. In other embodiments, other types of elementary frame sequence may be provided with some other number of ribs being superposed on assembly, the important point is that the total ribs height should exceed the defects of parallelism that are to be corrected. The above description is given in terms of ribs being used in pairs on any one face, together with three associated grooves. A minimum configuration consists in a single rib associated with a single groove on any given face.

The cross section of the ribs may be optimized to suit the selected mode of assembly and fixing (eg. by welding or by gluing). Cross sections such as those shown in FIGS. 16 to 20 may thus be used instead of that shown in FIG. 11.

What is claimed is:

1. A fuel cell structure constituted by a plurality of identical juxtaposed cells which are disposed in electrical contact with one another and in which multiple cell forming frames are fixed together in a predetermined elementary frame sequence, the said cell structure including three distributions networks which are common to all of the cells, as follows:
   an electrolyte distribution network for distributing electrolyte from an external source and including, in particular, a common inlet channel and a common outlet channel;
   a fuel distribution network for distributing fuel from an external source and including, in particular, at least one fuel inlet channel and at least one outlet channel for removing unburnt fuel and inert gases from the cell structure; and
   an oxidant distribution network including, in particular, a plurality of oxidant inlet and outlet orifices situated in the bottom and top faces of the cell structure;
   each cell additionally comprising:
   first and second porous electrodes which are preferably plane in shape with parallel faces, one being a cathode and the other an anode, and each including a specific catalyst;
   an electrolyte filling the gap situated between the said electrodes; and
   first and second impermeable bipolar current collectors comprising respective first and second frames of plastic material having at least one central conductive zone having channels on each of its faces, the first collector coming into electrical contact via the high points of its cathode face with the external surface of the said cathode, and via its anode face with the external surface of the anode of an adjacent cell, and the second collector coming into electrical contact via the high points of its anode face with the external surface of the said anode, and via its cathode face with the cathode of the other adjacent cell; the oxidizing gas from the said common oxidant distribution network flowing between the said cathode and the cathode face of the first collector and being supplied to the said cathode, and the fuel gas from the said common fuel distribution network flowing between the said anode and the anode face of the second collector and being supplied to the said anode; the said first and second frames being provided with orifices to allow the electrolyte and the fuel to flow through the cell structure, the said orifices contributing by their juxtaposition to defining the said common inlet and outlet channels;

the said first electrode being applied against a third frame made of plastic material and having a central orifice in the form of a quadrilateral, the top and bottom portions of the third frame including orifices for conveying fuel and electrolyte through the cell structure, said orifices corresponding to the orifices provided in the frames of the collectors, and likewise contributing to the formation of the said inlet and outlet channels for the fuel and the electrolyte, means being provided on one face of the third frame to enable electrolyte to be conveyed from the inlet channel, to an electrolyte compartment situated between the two electrodes, and from the said compartment to an outlet channel, the said means including grooves that open out into set back portions that constitute electrolyte distributing and collecting manifolds disposed on the top and bottom portions of the third frame along two opposite sides of the central orifice and in communication with the electrolyte chamber by means of a plurality of parallel microchannels delimited by ribs, the second electrode being applied against one of the faces of a fourth frame facing the said current collector, the said fourth frame being made of an insulating plastic material, and being of identical contour to the third frame against which the first electrode is applied having fuel and electrolyte conveying orifices corresponding to those provided in the said third frame, and being applied by a plane face against the face of the said third frame having the grooves and the electrolyte distributing and collecting manifolds, the frames are fixed together in a predetermined elementary frame sequence to constitute a repetitive stack of cells and to define the said fuel distribution network, the said oxidant distribution network, and the said electrolyte distribution network;

the improvement wherein said frames are made of a molded, deformable material, and wherein at least the fuel and electrolyte distribution networks are surrounded, at least on one face of one of the frames constituting the said elementary frame sequence, by at least one rib integral with said frame, said at least one rib standing proud from said face, and the distance the said at least one rib projects from said face being sufficient to compensate for the statistical average of all the defects in evenness and parallelism of the totality of the frames defining said fuel cell structure, and with at least one groove integrally molded within one of said frames bearing said at least one rib and the frame facing said at least one rib, and said at least one groove lying adjacent to said at least one rib and extending parallel to the said at least one rib to receive excess material from the at least one rib when the cell structure components are fixed together.

2. A cell structure according to claim 1, wherein said at least one rib comprises two parallel ribs around each of the said networks.

3. A cell structure according to claim 1, wherein said at least one rib and associated groove are located on the same face of a single frame.

4. A cell structure according to claim 1, wherein for the electrolyte distribution network, said at least one rib is situated between the said third and fourth frames and surrounds the electrolyte inlet orifice, the electrolyte distributing and collecting manifolds, the electrolyte compartment, and the electrolyte outlet orifice.

5. A cell structure according to claim 4, wherein the said at least one rib is on the face of the third frame which also has the grooves and set back portions that define the said electrolyte distribution network thereon.

6. A cell structure according to claim 4, wherein other integrally molded ribs are provided around the electrolyte inlet and outlet orifices, on at least one of the faces of the said first and/or second and/or fourth frames, and/or on the other face of the said third frame.

7. A fuel cell structure according to claim 1, wherein for the gas fuel distribution network, said at least one rib comprises a first rib running all the way around the entire gas compartment situated between the said second collector and the said second electrode and a second rib around each fuel inlet and outlet channel as defined by juxtaposing corresponding orifices of the said frames.

8. A fuel cell structure according to claim 7, wherein said rib surrounding the entire fuel distribution network is situated on that face of the said fourth frame which faces the said second frame.

9. A fuel cell structure according to claim 7, wherein at least one rib provided around the fuel inlet and outlet channels is located on at least one of the faces of the said first frame, and/or the said third frame, and/or the said forth frame.

10. A fuel cell structure according to claim 1, wherein the material of the said frame is one selected from the group consisting of polypropylene, polyethylene, polyvinyl chloride (PVC), acrylonitrile butadiene styrene (ABS), polysulfone and polystyrene.

* * * * *